(12) United States Patent
Larson et al.

(10) Patent No.: US 10,531,611 B2
(45) Date of Patent: Jan. 14, 2020

(54) ADJUSTABLE CHOPPING ASSEMBLY OUTLET FOR AN AGRICULTURAL COMBINE

(71) Applicant: Deere & Company, Moline, IL (US)

(72) Inventors: Matthew G. Larson, East Moline, IL (US); Justin D. Bruns, Port Byron, IL (US)

(73) Assignee: DEERE & COMPANY, Moline, IL (US)

( * ) Notice: Subject to any disclaimer, the term of this patent is extended or adjusted under 35 U.S.C. 154(b) by 56 days.

(21) Appl. No.: 15/730,118

(22) Filed: Oct. 11, 2017

(65) Prior Publication Data

US 2019/0104681 A1 Apr. 11, 2019

(51) Int. Cl.
| | |
|---|---|
| *A01D 41/127* | (2006.01) |
| *A01F 12/58* | (2006.01) |
| *A01D 41/12* | (2006.01) |
| *A01F 12/18* | (2006.01) |
| *A01F 12/30* | (2006.01) |

(52) U.S. Cl.
CPC ..... *A01D 41/1271* (2013.01); *A01D 41/1243* (2013.01); *A01F 12/18* (2013.01); *A01F 12/58* (2013.01); *A01F 12/30* (2013.01)

(58) Field of Classification Search
CPC ............ A01D 41/1271; A01D 41/1243; A01D 41/127; A01F 12/40; A01F 12/58; A01F 12/18; A01F 12/30; A01F 12/00; A01F 29/12
See application file for complete search history.

(56) References Cited

U.S. PATENT DOCUMENTS 3,350,017 A  10/1967 Howell et al.
6,251,009 B1 * 6/2001 Grywacheski .......... A01F 12/40
                                                460/112

(Continued)

FOREIGN PATENT DOCUMENTS

EP         3138383 A1     3/2017

OTHER PUBLICATIONS

European Patent Office Extended Search Report for Application No. 18199243.9 dated Feb. 18, 2019 (6 pages).

*Primary Examiner* — Arpad Fabian-Kovacs
(74) *Attorney, Agent, or Firm* — Michael Best & Friedrich LLP

(57) ABSTRACT

A chopping assembly is configured to receive crop plants processed by an agricultural combine harvester. The chopping assembly includes an inlet and a plurality of blades rotatable about an axis. The plurality of blades is positioned downstream of the inlet. The chopping assembly also includes an outlet positioned downstream of the plurality of blades. The outlet is partially defined by a first wall and a second wall. The chopping assembly further includes an actuator coupled to the second wall. The actuator is configured to move the second wall relative to the first wall. A control processor is in communication with the actuator. The control processor is configured to receive a first signal corresponding to a condition representative of a characteristic of the crop plants. The control processor is also configured to generate a second signal operable to control the actuator based on the condition.

20 Claims, 6 Drawing Sheets

(56) References Cited

U.S. PATENT DOCUMENTS

| | | | | |
|---|---|---|---|---|
| 7,044,853 B2* | 5/2006 | Weichholdt | A01D 41/1243 | 460/112 |
| 7,717,779 B1* | 5/2010 | Weichholdt | A01D 41/1243 | 460/112 |
| 7,896,732 B2* | 3/2011 | Benes | A01D 41/1243 | 460/112 |
| 8,079,900 B2* | 12/2011 | Klein | A01D 41/1243 | 460/111 |
| 8,210,915 B2* | 7/2012 | Holmen | A01F 12/40 | 460/112 |
| 8,585,475 B2* | 11/2013 | Isaac | A01D 41/1243 | 460/111 |
| 9,066,470 B2* | 6/2015 | Ricketts | A01D 41/1243 | |
| 10,130,039 B2* | 11/2018 | Mahieu | A01F 12/40 | |
| 2003/0190939 A1* | 10/2003 | Bueermann | A01F 12/40 | 460/111 |
| 2005/0124399 A1 | 6/2005 | Holmen | | |
| 2005/0282602 A1* | 12/2005 | Redekop | A01D 41/1243 | 460/112 |
| 2010/0291982 A1* | 11/2010 | Isaac | A01F 12/40 | 460/112 |
| 2012/0056024 A1* | 3/2012 | Isaac | A01F 12/40 | 241/25 |
| 2015/0038201 A1* | 2/2015 | Brinkmann | A01F 12/40 | 460/112 |
| 2015/0351322 A1* | 12/2015 | Desmet | A01D 41/1243 | 460/114 |
| 2016/0044869 A1 | 2/2016 | Mayerle | | |
| 2016/0057937 A1 | 3/2016 | McClure | | |
| 2016/0150727 A1 | 6/2016 | Mayerle | | |
| 2017/0013776 A1* | 1/2017 | Palla | A01D 41/127 | |
| 2017/0055445 A1* | 3/2017 | Mahieu | A01F 12/40 | |
| 2017/0099771 A1* | 4/2017 | Linde | A01F 12/40 | |

* cited by examiner

ADJUSTABLE CHOPPING ASSEMBLY OUTLET FOR AN AGRICULTURAL COMBINE

FIELD OF THE DISCLOSURE

The present disclosure relates to an agricultural combine harvester and particularly to a chopping assembly for an agricultural combine harvester including an adjustable outlet.

SUMMARY

In one aspect, an agricultural combine harvester is operable to move across an agricultural field and configured to harvest crop plants therefrom. The agricultural combine harvester includes a chassis and a cutting head assembly coupled to the chassis. The cutting head assembly is configured to reap the crop plants from the agricultural field. The agricultural combine harvester also includes a threshing assembly positioned downstream of the cutting head assembly. The threshing assembly is configured to receive the reaped crop plants from the cutting head assembly and separate the crop plants into a crop portion and a residue portion. The agricultural combine harvester further includes a chopping assembly positioned downstream of the threshing assembly. The chopping assembly includes an inlet, an outlet defining an outlet area, and a plurality of blades between the inlet and the outlet. The plurality of blades is configured to chop the residue portion before the residue portion exits the chopping assembly through the outlet. The agricultural combine harvester further includes a control processor in communication with the chopping assembly. The control processor is configured to receive a first signal corresponding to a condition representative of a characteristic of the crop plants. The control processor is also configured to generate a second signal operable to change the outlet area based on the condition.

In another aspect, a chopping assembly is configured to receive crop plants processed by an agricultural combine harvester. The chopping assembly includes an inlet and a plurality of blades rotatable about an axis. The plurality of blades is positioned downstream of the inlet. The chopping assembly also includes an outlet positioned downstream of the plurality of blades. The outlet is partially defined by a first wall and a second wall. The chopping assembly further includes an actuator coupled to the second wall. The actuator is configured to move the second wall relative to the first wall. A control processor is in communication with the actuator. The control processor is configured to receive a first signal corresponding to a condition representative of a characteristic of the crop plants. The control processor is also configured to generate a second signal operable to control the actuator based on the condition.

In yet another aspect, an agricultural combine harvester is operable to move across an agricultural field and configured to harvest crop plants therefrom. The agricultural combine harvester includes a chassis and a cutting head assembly coupled to the chassis. The cutting head assembly is configured to reap the crop plants from the agricultural field. The agricultural combine harvester also includes a threshing assembly positioned downstream of the cutting head assembly. The threshing assembly is configured to receive the reaped crop plants from the cutting head assembly and separate the crop plants into a crop portion and a residue portion. The agricultural combine harvester further includes a chopping assembly positioned downstream of the threshing assembly. The chopping assembly includes an inlet, an outlet, and a plurality of blades. The plurality of blades is configured to chop the residue portion before the residue portion exits the chopping assembly through the outlet. The outlet is biased into a first position by an actuator. The outlet is configured to move into a second position against a biasing force of the actuator in response to the residue portion traveling through the outlet.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

Figure 1:
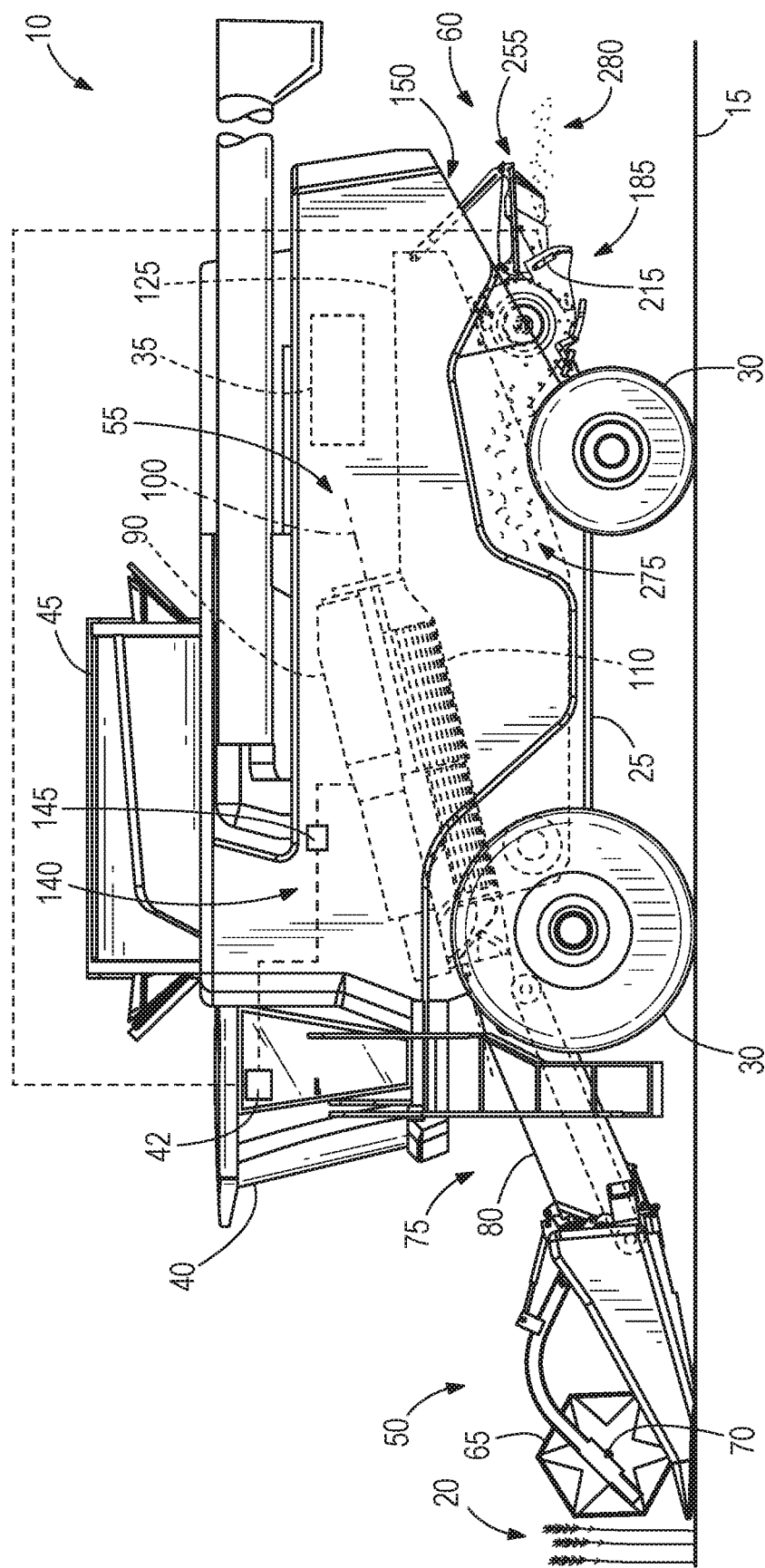
FIG. 1 is a side view of an agricultural combine harvester including a cutting head assembly, a threshing assembly, and a chopping assembly.

FIG. 1 illustrates a vehicle (i.e., an agricultural combine harvester 10) that is moveable across an agricultural field 15 to harvest crop plants 20 (e.g., wheat, corn, oats, rye, barley, beans, etc.). The combine 10 includes a chassis 25, wheels 30 coupled to the chassis 25, a prime mover 35 (e.g., an internal combustion engine) supported by the chassis 25, and a cab 40 also supported by the chassis 25. The wheels 30 engage the agricultural field 15 and are driven by the prime mover 35 to move the combine 10 across the field 15. The prime mover 35 also provides mechanical, hydraulic, and/or electrical power to other components and features of the combine 10. The cab 40 is configured to support an operator of the combine 10. The combine 10 also includes a control processor 42 that controls different components and operations of the combine 10, discussed in more detail below.

With continued reference to FIG. 1, the combine 10 also includes a grain tank 45, a cutting head assembly 50, a threshing assembly 55 positioned downstream of the cutting head assembly 50, and a chopping assembly 60 positioned downstream of the threshing assembly 55. The cutting head assembly 50 includes a reel 65 defining a rotational axis 70 that is transverse to a moving direction of the combine 10 and also includes cutting blades (not shown) that cut the crop plants 20 from the field 15. The cutting head assembly 50 is coupled to a front portion 75 of the chassis 25 and is in communication with the threshing assembly 55 via a conveyor 80. The cutting head assembly 50 also includes a feeding drum 85 (FIG. 2) positioned at an end of the conveyor 80 opposite the reel 65 with the feeding drum 85 rotatable about an axis substantially parallel to the rotational axis 70 of the reel 65.

Figure 2:
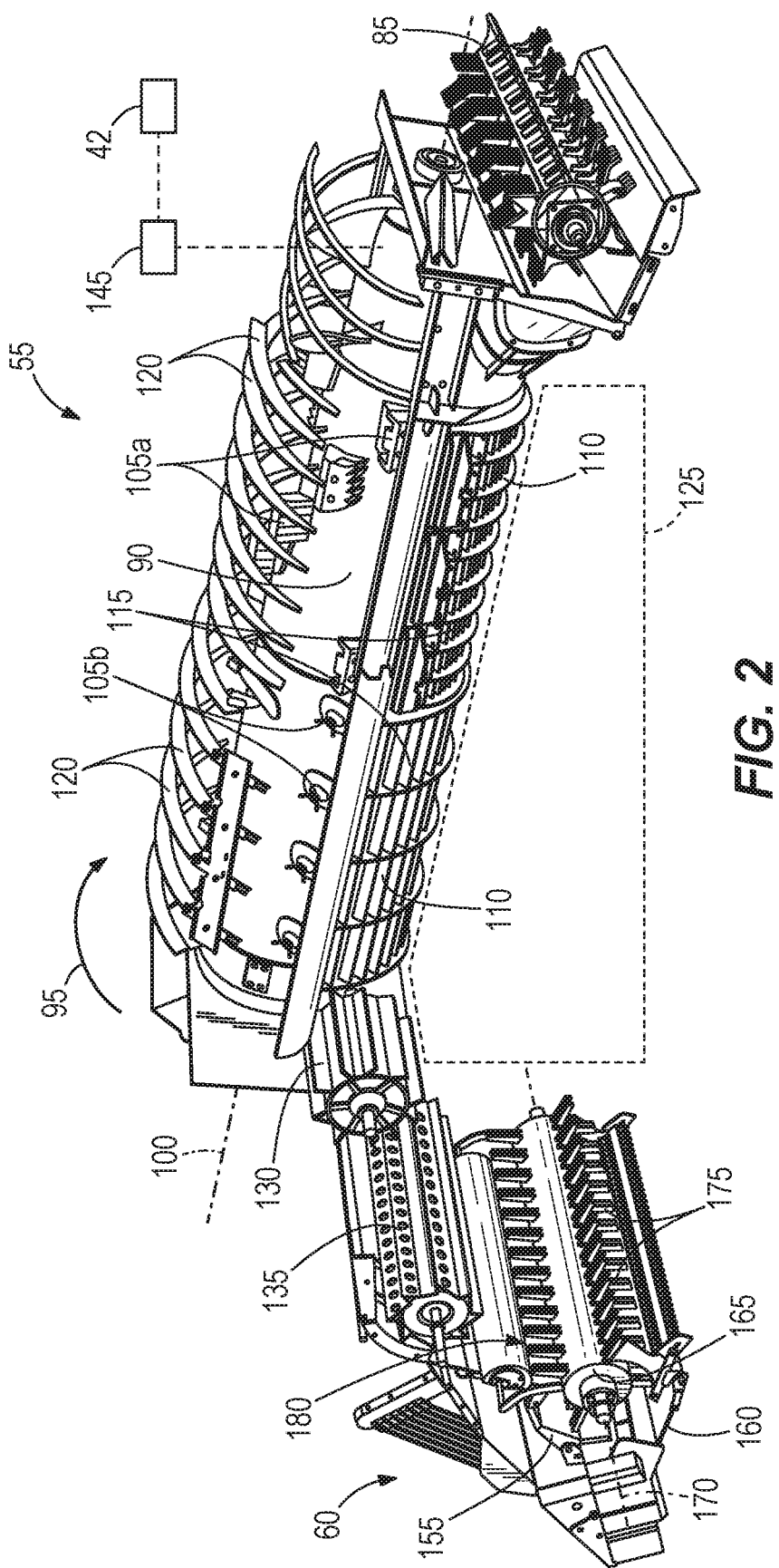
FIG. 2 is a perspective view of a portion of the threshing assembly and the chopping assembly of FIG. 1.

As best shown in FIG. 2, the threshing assembly 55 includes a rotor or threshing drum 90 movable in a rotational direction 95 about a longitudinal axis 100 and operable to move a residue portion of the crop plants 20 downstream toward the chopping assembly 60. The longitudinal axis 100 of the threshing drum 90 is substantially perpendicular to the rotational axis 70 of the reel 65. The threshing drum 90 includes protrusions 105a, 105b radially extending from an outer surface of the threshing drum 90. In the illustrated embodiment, the first group of protrusions 105a are arranged in a helical manner around the longitudinal axis 100 of the threshing drum 90 (e.g., the protrusions 105a are located adjacent a forward portion of the threshing drum 90), and the second group of protrusions 105b are arranged in an axial manner along the longitudinal axis 100 (e.g., the protrusions 105b are located adjacent a rearward portion of the threshing drum 90). In other embodiments, the threshing assembly 55 can include more than one threshing drum 90. In further embodiments, the threshing drum 90 can be replaced with a plurality of straw walkers (i.e., a plurality of longitudinal members (generally parallel to the longitudinal axis 100) positioned side-by-side and operable to move or reciprocate relative to each other to move the residue portion of the crop plants 20 downstream toward the chopping assembly 60).

With continued reference to FIG. 2, at least one arcuate separator plate 110 having a plurality of apertures 115 is positioned below the threshing drum 90, and a plurality of arcuate fins 120 is positioned above the threshing drum 90. The fins 120 are spaced along and obliquely angled relative to the longitudinal axis 100 of the threshing drum 90. In the illustrated embodiment, the separator plate 110 is positioned between the threshing drum 90 and a processing subassembly 125 (e.g., the processing subassembly 125 is directly below the threshing drum 90). The illustrated processing subassembly 125 is coupled to the grain tank 45 and configured to move a crop portion of the crop plants 20 into the grain tank 45, discussed in more detail below.

In addition, the threshing assembly 55 includes a first discharge drum 130 and a second discharge drum 135 located between the threshing drum 90 and the chopping assembly 60 (FIG. 2). Both discharge drums 130, 135 are rotatable about axes that are substantially perpendicular to the longitudinal axis 100 of the threshing drum 90. In other embodiments, the first discharge drum 130 and/or the second discharge drum 135 can be omitted.

Figure 3:
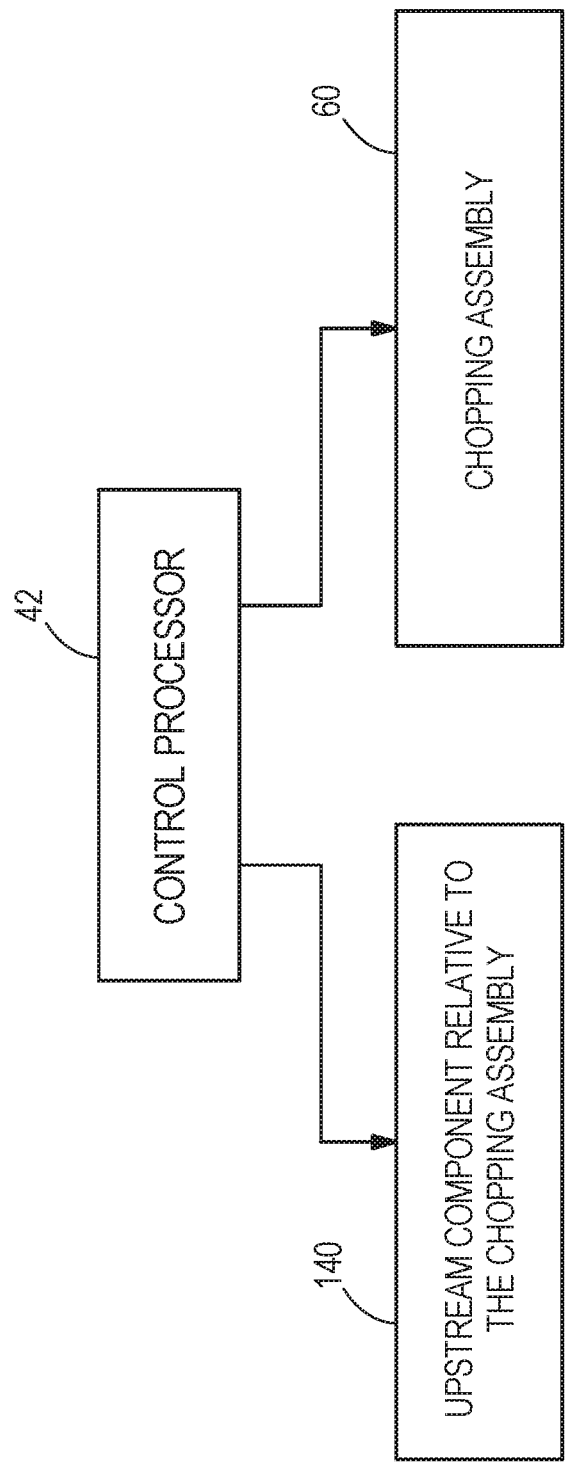
FIG. 3 is a schematic of a control processor of the agricultural combine harvester in communication with the chopping assembly and at least one of the threshing assembly and the cutting head assembly.

With reference to FIG. 3, the control processor 42 is in communication with an upstream component 140 relative to the chopping assembly 60. In particular, the upstream component 140 can be at least one of the cutting head assembly 50 and the threshing assembly 55. In the illustrated embodiment, the control processor 42 is in communication with the threshing assembly 55 via a measurement device 145 (FIGS. 1 and 2). For example, the measurement device 145 is in communication with the threshing drum 90. The illustrated measurement device 145 is a strain gauge and a speed sensor operable to measure a load condition of the threshing drum 90. The load condition of the threshing drum 90 can be representative of an amount of power applied to/consumed by the threshing drum 90 to rotate the threshing drum 90 at a desired rotational velocity in the rotational direction 95.

In other embodiments, the measurement device 145 can be in communication with other components of the threshing assembly 55 to measure a load condition or power consumption of the other components of the threshing assembly 55. For example, the measurement device 145 can be in communication with the first discharge drum 130 and/or the second discharge drum 135 to measure an amount of power applied to the discharge drums 130, 135 to rotate the drums 130, 135 at a desired rotational velocity in a desired direction. In further embodiments, the measurement device 145 can be in communication with the reel 65, the conveyor 80, and/or the feeding drum 85 of the cutting head assembly 50. For example, the measurement device 145 can measure an amount of power applied to the reel 65 to move the reel 65 at a desired rotational velocity about the rotational axis 70, an amount of power applied to the conveyor 80 to move the conveyor 80 at a desired velocity in a desired direction, and/or an amount of power applied to the feeding drum 85 to move the feeding drum 85 at a desired rotational velocity in a desired direction. In yet further embodiments, the measurement device 145 can be in communication with both the cutting head assembly 50 and the threshing assembly 55. In yet further embodiments, more than one measurement device 145 can be in communication with the cutting head assembly 50 and/or the threshing assembly 55. In yet further embodiments, the measurement device 145 can be coupled to a drive mechanism (e.g., a motor, hydraulics, etc.) that is operable to move the reel 65, the conveyor 80, the feeding drum 85, the threshing drum 90, the first discharge drum 130, and/or the second discharge drum 135. For example, if the cutting head assembly 50 and/or the threshing assembly 55 are driven by a hydraulic mechanism, the measurement device 145 can measure a flowrate of hydraulic fluid and/or hydraulic pressure to drive the cutting head assembly 50 and/or the threshing assembly 55. If the cutting head assembly 50 and/or the threshing assembly 55 are driven by an electric motor, the measurement device 145 can measure the voltage and/or amperage used to drive the cutting head assembly 50 and/or the threshing assembly 55.

Figure 4:
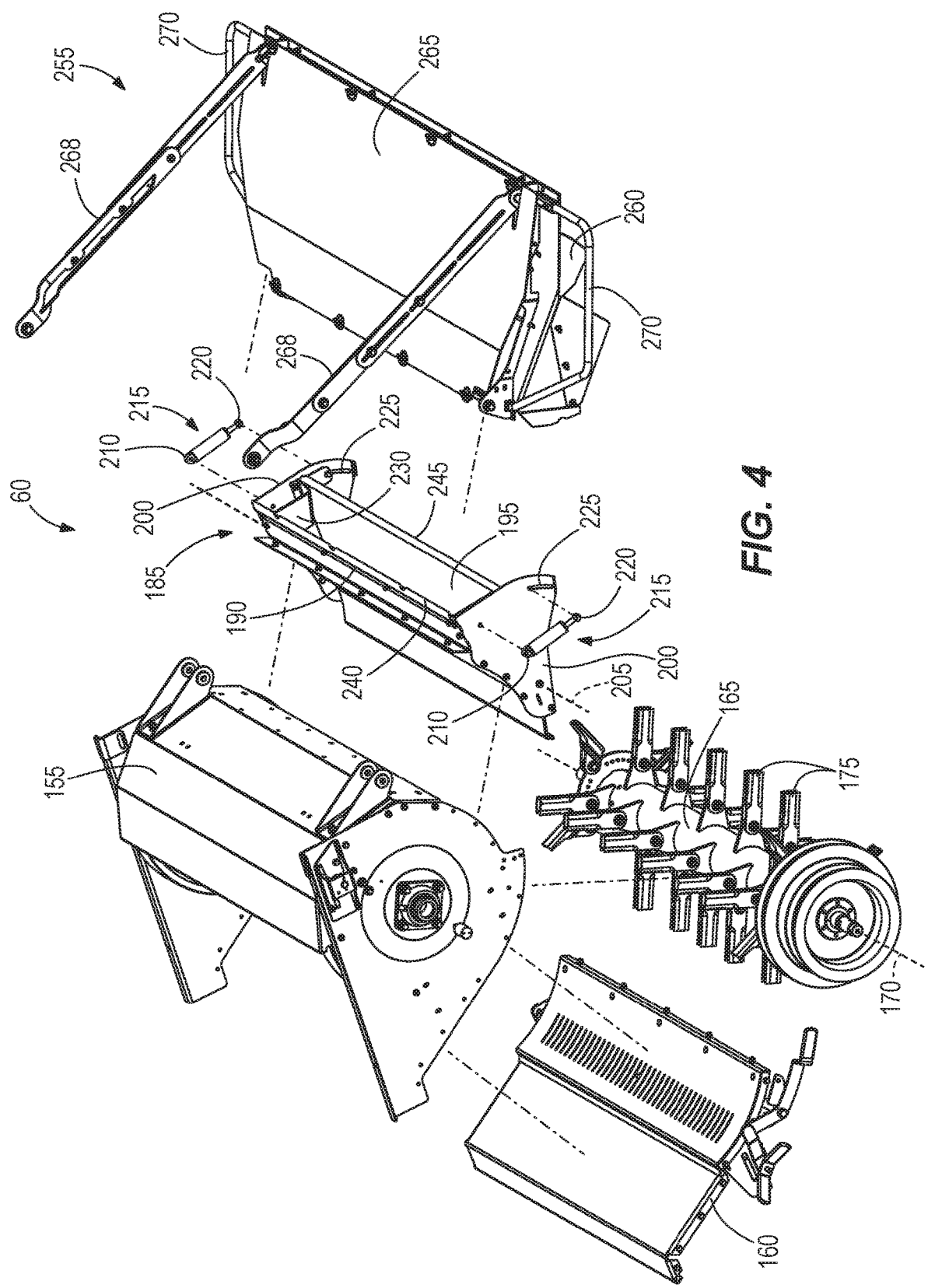
FIG. 4 is an exploded view of the chopping assembly of FIG. 1.
Figure 5:
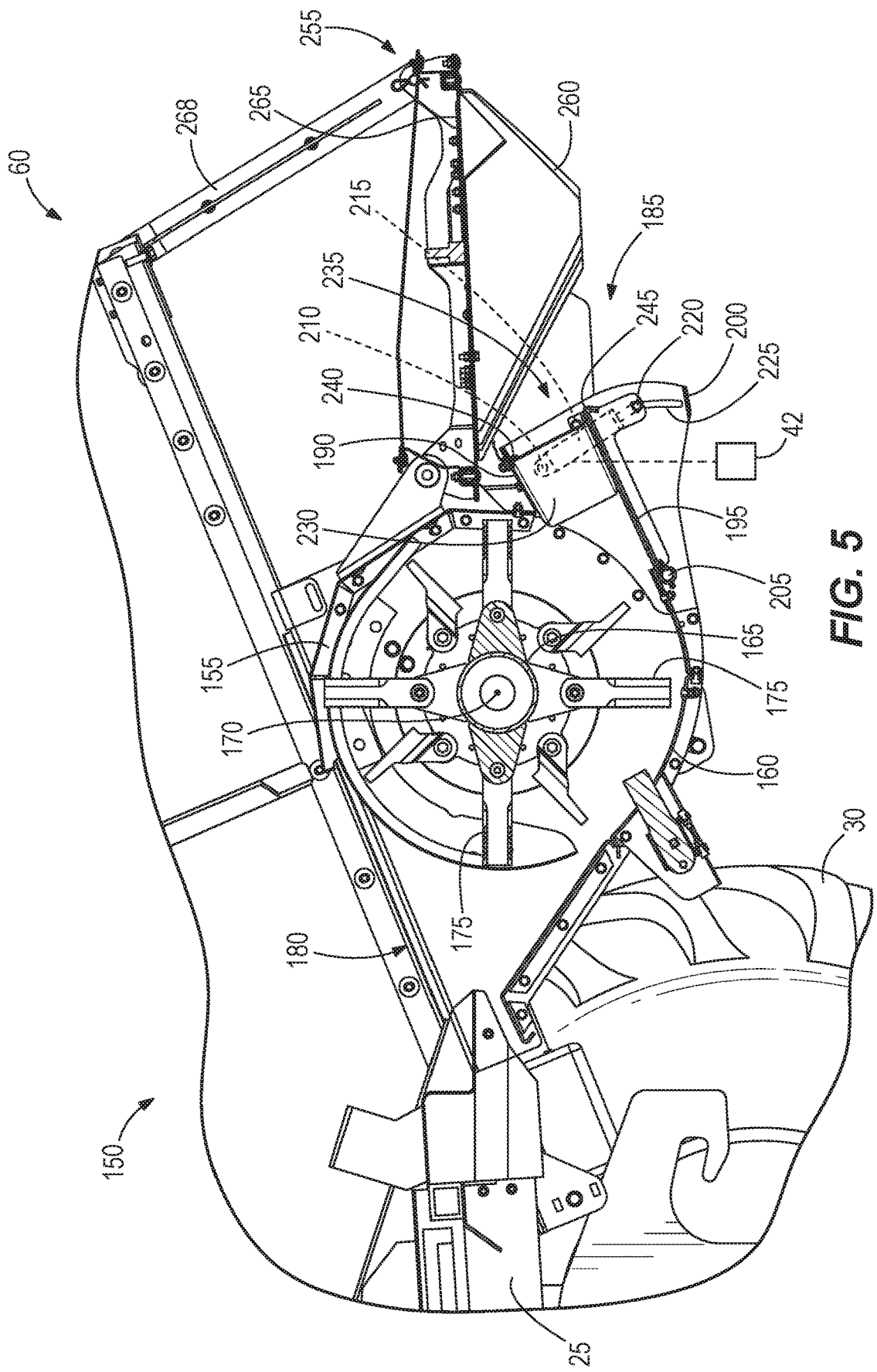
FIG. 5 is an internal partial side view of the chopping assembly of FIG. 1 including an adjustable outlet of the chopping assembly in a first position.

Referring to FIG. 3, the control processor 42 is also in communication with the chopping assembly 60. The illustrated chopping assembly 60 is coupled to a rear portion 150 of the combine 10 (FIG. 1). As best shown in FIG. 4, the chopping assembly 60 includes an upper housing 155 and a bottom housing 160 that partially surround a chopping drum 165. The illustrated chopping drum 165 is rotatable about a chopper axis 170 that is substantially perpendicular to the longitudinal axis 100 of the threshing drum 90 and includes a plurality of blades 175 radially extending away from the chopper axis 170. The chopping assembly 60 also includes an inlet 180 (see also FIG. 2) defined by the upper housing 155 and the bottom housing 160 and positioned upstream from the chopping drum 165 (FIG. 5). The chopping assembly 60 further includes an adjustable outlet 185 positioned downstream of the chopping drum 165 (FIGS. 4 and 5). In particular, the illustrated outlet 185 includes a top wall 190 fixed to the upper housing 155 (FIG. 5), a bottom wall 195 opposite the top wall 190, and two opposing side walls 200 (FIG. 4). The bottom wall 195 is moveable relative to the top wall 190 and the two opposing side walls 200 about a pivot axis 205 (FIGS. 4 and 5), which is substantially parallel to the chopper axis 170. In other embodiments, the top wall 190 can be moveable and the bottom wall 195 can be fixed.

With reference to FIG. 4, a first end 210 of an actuator 215 (e.g., a hydraulic cylinder) is coupled to an outside surface of each opposing side wall 200, whereas a second end 220 of each actuator 215 is coupled to the bottom wall 195. The illustrated actuators 215 are generally vertical relative to the field 15. In particular, the opposing side walls 200 each include an arcuate slot 225 through which a fastener extends to couple the second ends 220 of the actuators 215 to the bottom wall 195. In other embodiments, the actuators 215 can be coupled to the opposing side walls 200 and the bottom wall 195 in a different configuration. For example, both ends 210, 220 of the actuators 215 can be positioned below the bottom wall 195 with the actuators 215 coupled to an inner surface of the opposing side walls 200. In other embodiments, the actuators 215 can be oriented generally horizontally relative to the field 15 to be coupled to a flange extending below the bottom wall 195 adjacent the pivot axis 205 to pivot the bottom wall 195 about the pivot axis 205. In further embodiments, the actuators 215 can be springs, electric actuators, or the like.

Figure 6:
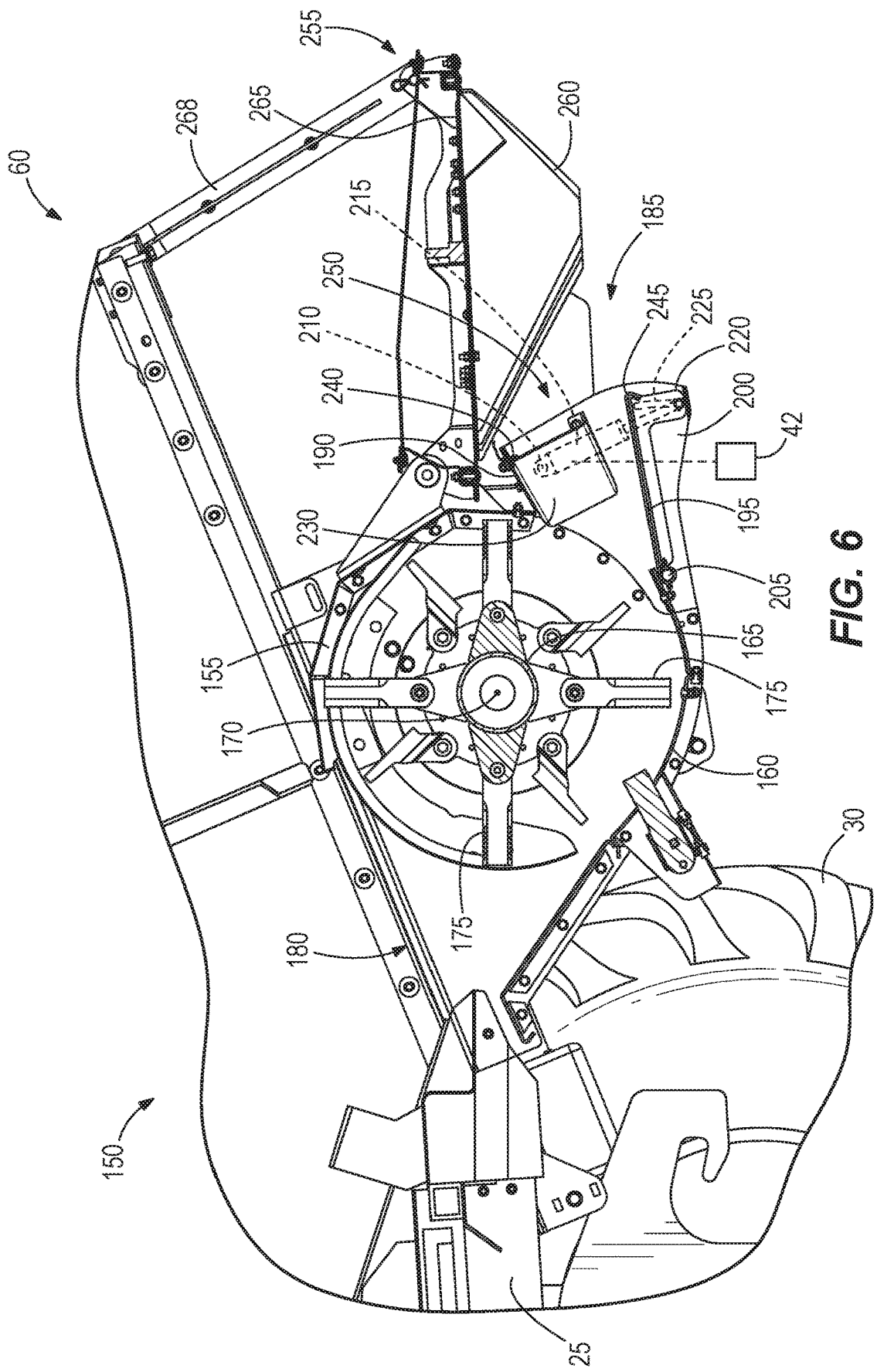
FIG. 6 is an internal partial side view of the chopping assembly of FIG. 1 including the adjustable outlet in a second position.

In addition, a side deflector 230 is coupled to an inner surface of each opposing side wall 200 to be positioned between the top wall 190 and the bottom wall 195 (only one side deflector 230 is illustrated in FIGS. 4-6). In the illustrated embodiment, the side deflectors 230 are fixed and non-parallel (e.g., obliquely oriented) relative to the opposing side walls 200. In other embodiments, the side deflectors 230 can be coupled to the inner surfaces of the opposing side walls 200 and the bottom wall 195 so that a portion of each side deflector 230 is fixed to one opposing side wall 200 and another portion of each side deflector 230 moves with the bottom wall 195 (e.g., the side deflectors 230 extend or retract with movement of the bottom wall 195). In other embodiments, the side deflectors 230 can be omitted.

In the illustrated embodiment, the actuators 215 are coupled to the control processor 42 for the control processor 42 to control movement of the bottom wall 195 between a first position (FIG. 5) and a second position (FIG. 6). In the first position, the actuators 215 are actuated (e.g., retracted) to position the bottom wall 195 relative to the top wall 190 so that the outlet 185 defines a first area 235. In other embodiments, the actuators 215 can be extended to position the bottom wall 195 in the first position (FIG. 5). The illustrated first area 235 is defined by inner surfaces of the top wall 190, the bottom wall 195, and the opposing side walls 200 within a plane intersecting a top end 240 of the top wall 190, a bottom end 245 of the bottom wall 195, and the two opposing side walls 200 (e.g., the plane is perpendicular to the opposing side walls 200). In the illustrated embodiment, the first area 235 is about 335 inches squared. In other embodiments, the first area 235 can be between about 300 inches squared and about 370 inches squared. In the second position, the actuators 215 are actuated (e.g., extended) by the control processor 42 to pivot the bottom wall 195 away from the top wall 190. As such, the outlet 185 increases to define a second area 250 larger than the first area 235. In other embodiments, the actuators 215 can be retracted to position the bottom wall 195 in the second position (FIG. 6). The second area 250 is defined by the same plane and the inner surfaces of the top wall 190, the bottom wall 195, and the opposing side walls 200 as the first area 235. In the illustrated embodiment, the second area 250 is about 495 inches squared. In other embodiments, the second area 250 can be between about 445 inches squared and about 544 inches squared. In the second position (FIG. 6), the bottom wall 195 downwardly pivots about 14 degrees relative to the first position of the bottom wall 195 (FIG. 5). In other words, the bottom wall 195 can pivot at a maximum of about 14 degrees between the first and second positions of the bottom wall 195. In other embodiments, the maximum movement of the bottom wall 195 can be between about 5 degrees and about 25 degrees. In one embodiment, a ratio of the first area 235 over the second area 250 is about 0.68. In other embodiments, the ratio of the first area 235 over the second area 250 can be between about 0.4 and about 0.8.

With reference to FIGS. 4-6, the chopping assembly 60 also includes a tail deflector 255 positioned downstream of the outlet 185 having a plurality of arcuate fins 260. The illustrated arcuate fins 260 are independently adjustably coupled to a base 265 of the tail deflector 255 such that each arcuate fin 260 can pivot toward either side of the chassis 25. The illustrated base 265 is pivotably coupled to the upper housing 155 with arms 268 supporting the base 265 to the rear portion 150 of the chassis 25. Handles 270 are coupled to the base 265 to facilitate movement of the base 265 and the arcuate fins 260 relative to the upper housing 155.

In operation, the cutting head assembly 50 is configured to reap (e.g., cut and gather) the crop plants 20 from the field 15 for the crop plants 20 to be conveyed into the threshing assembly 55 via the conveyor 80 and the feeding drum 85. The illustrated threshing assembly 55 is operable to separate the crop plants 20 into a crop portion 275 and a residue portion 280 (FIG. 1). In particular, as the threshing drum 90 rotates in the rotational direction 95, the protrusions 105a, 105b push the crop plants 20 about the longitudinal axis 100 relative to the separator plate 110 and the arcuate fins 120. The crop plants 20 come into contact with the arcuate fins 120 so that the arcuate fins 120 also push the crop plants 20 downstream and toward the chopping assembly 60. As the crop plants 20 rotate about the threshing drum 90, the crop plants 20 are separated into the crop portion 275 that falls through the plurality of apertures 115 formed within the separator plate 110 to be collected within the processing subassembly 125. From the processing subassembly 125, the crop portion 275 is transferred to the grain tank 45. In contrast, the residue portion 280 is too large to fall through the separator plate 110. As a result, the residue portion 280 continues to move downstream to the first discharge drum 130. Once the residue portion 280 reaches the first discharge drum 130, the first discharge drum 130 accelerates the residue portion 280 toward the second discharge drum 135, and the second discharge drum 135 directs the residue portion 280 into the chopping assembly 60.

The residue portion 280 then enters the chopping assembly 60 through the inlet 180 to be chopped into smaller particles via the plurality of blades 175 before the chopped residue portion 280 exits the chopping assembly 60 through the outlet 185. The outlet 185 directs the chopped residue portion 280 toward the tail deflector 255 for the chopped residue portion 280 to pass between the plurality of arcuate fins 260. The side deflectors 230 are operable to direct the chopped residue portion 280 away from the opposing sidewalls 200 and toward a center of the tail deflector 255 so that the chopped residue portion 280 is evenly distributed onto the field 15.

In the illustrated embodiment, the control processor 42 actively controls an area of the outlet 185 by moving the bottom wall 195 between the first position (FIG. 5) and the second position (FIG. 6) based on a load condition of the upstream component 140 to inhibit the residue portion 280 from clogging the outlet 185 of the chopping assembly 60. For example, the outlet 185 could clog or plug with the residue portion 280 under various characteristics of the residue portion 280 (e.g., if a density of the residue portion 280 is too high, if the residue portion 280 is too wet, a composition of the residue portion 280 is too weedy/viny, etc.). The illustrated control processor 42 monitors a load condition of the upstream component 140 to anticipate a potential clog of the outlet 185 and generates a signal to the actuators 215 to move the bottom wall 195 before the potential clog portion reaches the outlet 185. In the illustrated embodiment, the measurement device 145 measures power applied to the threshing drum 90 as the threshing drum 90 pushes the crop plants 20 downstream. In other embodiments, the measurement device 145 can measure power applied to other components of the threshing assembly 55 and/or the cutting head assembly 50. The power applied to the threshing assembly 55 and/or the cutting head assembly 50 is dependent upon characteristics of the crop plants 20. Thus, the load condition of the upstream component 140 is representative of a characteristic of the crop plants 20. For example, if the crop plants 20 include a high moisture content (e.g., the crop plants 20 weigh more than if the moisture content was low), the heavier weight of the crop plants 20 will act against the movement of the threshing drum 90 in the rotational direction 95 (e.g., slowing down a rotational velocity of the threshing drum 90), thus requiring more power to move the threshing drum 90 at a desired rotational velocity. The illustrated measurement device 145 will measure the power applied to the threshing drum 90 (e.g., the control processor 42 receives a signal from the measurement device 145), and if the power is above a determined amount (e.g., set point), the control processor 42 will actuate the actuators 215 to move the bottom wall 195 toward the second position (e.g., increase the area of the outlet 185; FIG. 6). In other embodiments, the control processor 42 actively controls an area of the outlet 185 by moving the bottom wall 195 between the first position (FIG. 5) and the second position (FIG. 6) based on a load condition of the chopping drum 165 to inhibit the residue portion 280 from clogging the outlet 185 of the chopping assembly 60.

In one embodiment, the control processor 42 includes a time delay to move the bottom wall 195 after the potential clog portion is observed in the threshing assembly 55. For example, once the potential clog portion is observed in the threshing assembly 55, the control processor 42 can move the bottom wall 195 after the potential clog portion exits the threshing assembly 55 (e.g., as the potential clog portion enters the inlet 180 of the chopping assembly 60, the control processor 42 can move the bottom wall 195 as the potential clog portion passes by the chopping drum 165, etc.). In any instance, the control processor 42 moves the bottom wall 195 to increase the area of the outlet 185 before the potential clog portion reaches the outlet 185. Furthermore, the amount of time delay is dependent upon at what point within the process the potential clog portion is observed within the cutting head assembly 50 and/or the threshing assembly 55. For example, the time delay is longer if the potential clog portion is observed in the cutting head assembly 50 than if the potential clog portion is observed in the threshing assembly 55 as the potential clog portion will take longer to reach the chopping assembly 60 from the cutting head assembly 50 than the threshing assembly 55.

In some embodiments, the control processor 42 increases the area of the outlet 185 to a desired amount dependent upon a quantity of the power consumption measured by the measurement device 145. For example, if the measured power consumption is slightly above the set point amount, the control processor 42 increases the area of the outlet 185 proportionally or by a small amount (e.g., pivots the bottom wall 195 about 5 degrees from its first position). However, if the measured power consumption is significantly above the set point amount, the control processor 42 increases the area of the outlet 185 a large amount (e.g., pivots the bottom wall 195 about 14 degrees from its first position). In contrast, if the measured power consumption is below the set point amount, the control processor 42 moves the bottom wall 195 to the first position (FIG. 5) and maintains the relationship between the top and bottom walls 190, 195. Such progressive adjustment of the outlet 185 allows for the control processor 42 to limit the area of the outlet 185 without causing a potential clog in the outlet 185, yet still maintain adequate and efficient spreading of the residue portion 280 exiting the tail deflector 255. Specifically, efficient spreading of the residue portion 280 is achieved by reducing the area of the outlet 185 to concentrate the residue portion 280 exiting the outlet 185 toward the tail deflector 255. As the area of the outlet 185 increases, the efficiency of spreading the residue portion 280 onto the field 15 decreases. As such, adjustment of the outlet 185 balances efficient spreading of the residue portion 280 (by decreasing the area of the outlet 185) with inhibition of potential clog formation in the outlet 185 (by increasing the area of the outlet 185).

In other embodiments, measurement device 145 is a speed sensor or the like operable to measure a load condition of the threshing drum 90 by measuring a rotational velocity of the threshing drum 90. The rotational velocity of the threshing drum 90 is also dependent upon characteristics of the crop plants 20. For example, if the crop plants 20 include a high moisture content (e.g., the crop plants 20 weigh more than if the moisture content was low), the heavier weight of the crop plants 20 will act against the movement of the threshing drum 90 in the rotational direction 95, thus slowing down the threshing drum 90. The illustrated measurement device 145 will measure the rotational velocity of the threshing drum 90, and if the rotational velocity is below a determined amount (e.g., set point), the control processor 42 will actuate the actuators 215 to move the bottom wall 195 toward the second position (e.g., increase the area of the outlet 185; FIG. 6). In further embodiments, the measurement device 145 can be in communication with other components of the threshing assembly 55 to measure a load condition (e.g., velocity) of the other components of the threshing assembly 55. For example, the measurement device 145 can be in communication with the first discharge drum 130 and/or the second discharge drum 135 to measure a rotational velocity of the discharge drums 130, 135. In further embodiments, the measurement device 145 can measure a rotational velocity of the reel 65, a velocity of the conveyor 80, and/or a rotational velocity of the feeding drum 85. In yet further embodiments, the control processor 42 can measure a rotational velocity of the chopping drum 165 for the control processor 42 to actively control an area of the outlet 185 by moving the bottom wall 195 between the first position (FIG. 5) and the second position (FIG. 6) based on a load condition (e.g., velocity) of the chopping drum 165 to inhibit the residue portion 280 from clogging the outlet 185 of the chopping assembly 60.

In other embodiments, measurement device 145 is a dynamometer or the like operable to measure a load condition of the threshing drum 90 by measuring torque applied to the threshing drum 90. The torque applied to the threshing drum 90 is also dependent upon characteristics of the crop plants 20. For example, if the crop plants 20 include a high moisture content, the heavier weight of the crop plants 20 will act against the movement of the threshing drum 90 in the rotational direction 95, thus requiring more torque to move the threshing drum 90 in the rotational direction 95. The illustrated measurement device 145 will measure the torque applied to the threshing drum 90, and if the torque is above a set point amount, the control processor 42 will actuate the actuators 215 to move the bottom wall 195 toward the second position (e.g., increase the area of the outlet 185; FIG. 6). In further embodiments, the measurement device 145 can be in communication with other components of the threshing assembly 55 to measure a load condition of (e.g., torque applied to) the other components of the threshing assembly 55. For example, the measurement device 145 can be in communication with the first discharge drum 130 and/or the second discharge drum 135 to measure the torque applied to the discharge drums 130, 135. In further embodiments, the measurement device 145 can measure the torque applied to the reel 65, the torque applied to the conveyor 80, and/or the torque applied to the feeding drum 85. In yet further embodiments, the control processor 42 can measure the torque applied to the chopping drum 165 for the control processor 42 to actively control an area of the outlet 185 by moving the bottom wall 195 between the first position (FIG. 5) and the second position (FIG. 6) based on a load condition of (e.g., torque applied to) the chopping drum 165 to inhibit the residue portion 280 from clogging the outlet 185 of the chopping assembly 60. In other embodiments, the measurement device 145 can be a mass flow sensor operable to measure a rate of weight/mass of at least a portion of the crop plants 20 traveling through at least one of the cutting head assembly 50, the threshing assembly 55, and the chopping assembly 60.

In other embodiments, the measurement device 145 can measure at least one physical characteristic of the crop plants 20 (e.g., density, weight, moisture content, composition, etc.) traveling through the upstream component 140 rather than measure a load or other dynamic condition of the upstream component 140. For example, the measurement device 145 can measure a moisture content of the crop plants 20 traveling through the threshing assembly 55 and/or the cutting head assembly 50, the measurement device 145 can measure the weight of the crop plants 20 on the conveyor 80, the measurement device 145 can be a camera that captures images of the crop plants 20 traveling through the threshing assembly 55 and/or the cutting head assembly 50 so that the control processor 42 can analyze the images to determine the characteristics of the crop plants 20 (e.g., moisture content, composition, etc.). As such, the control processor 42 can control an area of the outlet 185 by moving the bottom wall 195 between the first position (FIG. 5) and the second position (FIG. 6) based on a condition or characteristic of the crop plants 20 to inhibit the residue portion 280 from clogging the outlet 185 of the chopping assembly 60. In other embodiments, the measurement device 145 can measure at least one characteristic of the residue portion 280 traveling through the inlet 180 of the chopping assembly 60.

As described above, the actuators 215 can be springs (e.g., coil springs). As such, the springs 215 can control an area of the outlet 185 in response to the potential clog portion exiting the outlet 185. For example, if the residue portion 280 is too thick or too clumpy to exit the outlet 185 when the outlet 185 is in the first position (FIG. 5), the springs 215 will allow for movement of the bottom wall 195 toward the second position (FIG. 6) as the potential clog portion is pushed out of the outlet 185. As a result, movement of the bottom wall 195 is passive and based on the residue portion 280 traveling through the outlet 185. Once the potential clog portion exits the outlet 185, the springs 215 bias the bottom wall 195 back into the first position (FIG. 5). In other embodiments, the actuators 215 can be at least one torsional spring coupled about the pivot axis 205.

In further embodiments, the measurement device 145 can be a pressure sensor operable to measure air pressure within the processing subassembly 125 (commonly known as a cleaning shoe of the combine 10). The air pressure within or the airflow rate through the processing subassembly 125 (produced by at least one fan; not shown) is used to further clean or separate the reside portion 280 from the crop portion 275. For example, in some instances, smaller particles of the residue portion 280 can fall through the separator plate 110 and into the processing subassembly 125. The air pressure within the processing subassembly 125 acts to further separate the residue portion 280 from the crop portion 275 so that the smaller particles of the residue portion 280 within the processing subassembly 125 are directed into the chopping assembly 60, and the crop portion 275 is directed into the grain tank 45. The desired amount of air pressure within the processing subassembly 125 corresponds to a condition representative of a characteristic of the crop plants 20. For example, if the crop portion 275 of a certain crop plant 20 is relatively heavy, then the desired air pressure/airflow rate within the processing subassembly 125 can be relatively high acting to separate the residue portion 280 from the crop portion 275 and directing the residue portion 280 into the chopping assembly 60 without also pushing the crop portion 275 into the chopping assembly 60. In contrast, if the crop portion 275 of a certain crop plant 20 is relatively light, then the desired air pressure/airflow rate within the processing subassembly 125 is relatively low acting to separate the residue portion 280 from the crop portion 275 and directing the residue portion 280 into the chopping assembly 60 without also pushing the lighter crop portion 275 into the chopping assembly 60. In this embodiment, the control processor 42 can control the adjustable outlet 180 to control the air pressure within the processing subassembly 125 to change the separation characteristics of the residue portion 280 and the crop portion 275 within the processing subassembly 125. In particular, by increasing the outlet 180 to the second area 250 (FIG. 6), more air can escape from the processing subassembly 125 through the chopping assembly 60, thereby decreasing the pressure within the processing subassembly 125. By decreasing the outlet 180 to the first area 235, less air can escape from the processing subassembly 125 through the chopping assembly 60, thereby increasing the pressure within the processing subassembly 125. In other embodiments, the control processor 42 can control an outlet (e.g., a valve or the like) that is different from the outlet 180, which is in communication with the processing subassembly 125, based on a pressure within the processing subassembly 125 to change the separation characteristics of the residue portion 280 and the crop portion 275 within the processing subassembly 125.

In one embodiment, the control processor 42 can automatically control the outlet 180 based on a pressure within the processing subassembly 125 and a load condition of at least one of the cutting head assembly 50, the threshing assembly 55, and the chopping assembly 60. For example, if the load condition of the at least one of the cutting head assembly 50, the threshing assembly 55, and the chopping assembly 60 is below the set point amount, the control processor 42 controls the outlet 180 based on the pressure within the processing subassembly 125. However, if the load condition of the at least one of the cutting head assembly 50, the threshing assembly 55, and the chopping assembly 60 is above the set point amount, the control processor 42 controls the outlet 180 based on the load condition to prevent a clog within the outlet 180. In other embodiments, an operator of the combine 10 can manually switch between having the control processor 42 control the outlet 180 based on a load condition of at least one of the cutting head assembly 50, the threshing assembly 55, and the chopping assembly 60 to inhibit a clog condition within the outlet 180 and control the outlet 180 based on a pressure within the processing subassembly 125 to change the separation characteristics of the residue portion 280 and the crop portion 275 within the processing subassembly 125.

Although the disclosure has been described in detail with reference to certain preferred embodiments, variations and modifications exist within the scope and spirit of one or more independent aspects of the disclosure as described. Various features of the disclosure are set forth in the following claims.

The invention claimed is:

1. An agricultural combine harvester operable to move across an agricultural field and configured to harvest crop plants therefrom, the agricultural combine harvester comprising:
a chassis;
a cutting head assembly coupled to the chassis, the cutting head assembly configured to reap the crop plants from the agricultural field;
a threshing assembly positioned downstream of the cutting head assembly, the threshing assembly configured to receive the reaped crop plants from the cutting head assembly and separate the crop plants into a crop portion and a residue portion;
a chopping assembly positioned downstream of the threshing assembly, the chopping assembly including an inlet, an outlet defining an outlet area, and a plurality of blades between the inlet and the outlet, the plurality of blades configured to chop the residue portion before the residue portion exits the chopping assembly through the outlet; and
a control processor in communication with the chopping assembly, the control processor configured to receive a first signal corresponding to a condition representative of a characteristic of the crop plants, the control processor also configured to generate a second signal operable to change the outlet area based on the condition.

2. The agricultural combine harvester of claim 1, wherein the threshing assembly includes a threshing drum rotatable in a direction, and wherein the threshing drum is configured to move the residue portion toward the chopping assembly in response to the threshing drum rotating in the direction, and wherein the condition is a load condition of the threshing assembly defined by power applied to the threshing drum to move the residue portion toward the chopping assembly.

3. The agricultural combine harvester of claim 2, wherein the threshing drum is in communication with a measurement device, and wherein the measurement device is configured to measure the power applied to the threshing drum, and wherein the control processor is configured to receive the first signal from the measurement device.

4. The agricultural combine harvester of claim 3, wherein the measurement device is a strain gauge and a speed sensor.

5. The agricultural combine harvester of claim 1, wherein the outlet area is partially defined by a first wall and a second wall, and wherein the second wall is configured to pivot about an axis relative to the first wall.

6. The agricultural combine harvester of claim 5, wherein the second wall is coupled to an actuator, and wherein the actuator is configured to move the second wall relative to the first wall.

7. The agricultural combine harvester of claim 6, wherein the control processor is in communication with the actuator, and wherein the control processor is configured to generate the second signal to control the actuator based on the condition.

8. The agricultural combine harvester of claim 6, wherein the actuator is a hydraulic cylinder.

9. The agricultural combine harvester of claim 1, wherein the control processor is configured to delay time between receiving the first signal and generating the second signal.

10. The agricultural combine harvester of claim 1, wherein the condition is a physical characteristic of the crop plants traveling through at least one of the cutting head assembly and the threshing assembly.

11. A chopping assembly configured to receive crop plants processed by an agricultural combine harvester, the chopping assembly comprising:
an inlet;
a plurality of blades rotatable about an axis, the plurality of blades positioned downstream of the inlet;
an outlet positioned downstream of the plurality of blades, the outlet partially defined by a first wall and a second wall; and
an actuator coupled to the second wall, the actuator configured to move the second wall relative to the first wall,
wherein a control processor is in communication with the actuator, and wherein the control processor is configured to receive a first signal corresponding to a condition representative of a characteristic of the crop plants, and wherein the control processor is also configured to generate a second signal operable to control the actuator based on the condition.

12. The chopping assembly of claim 11, wherein the second wall is configured to pivot about an axis relative to the first wall.

13. The chopping assembly of claim 11, wherein the actuator is a hydraulic cylinder.

14. The chopping assembly of claim 11, further comprising a deflector positioned downstream of the outlet, the deflector including a plurality of fins.

15. The chopping assembly of claim 11, wherein a measurement device is configured to measure the condition representative of the characteristic of the crop plants, and wherein the condition is configured to be a load condition of a component of the agricultural combine harvester upstream of the chopping assembly.

16. The chopping assembly of claim 15, wherein the measurement device is a strain gauge and a speed sensor.

17. The chopping assembly of claim 11, wherein a measurement device is configured to measure the condition representative of the characteristic of the crop plants, and wherein the condition is a physical characteristic of the crop plants.

18. The chopping assembly of claim 11, wherein the control processor is configured to delay time between receiving the first signal and generating the second signal.

19. An agricultural combine harvester operable to move across an agricultural field and configured to harvest crop plants therefrom, the agricultural combine harvester comprising:
a chassis;
a cutting head assembly coupled to the chassis, the cutting head assembly configured to reap the crop plants from the agricultural field;
a threshing assembly positioned downstream of the cutting head assembly, the threshing assembly configured to receive the reaped crop plants from the cutting head assembly and separate the crop plants into a crop portion and a residue portion; and a chopping assembly positioned downstream of the threshing assembly, the chopping assembly including an inlet, an outlet, and a plurality of blades, the plurality of blades configured to chop the residue portion before the residue portion exits the chopping assembly through the outlet, wherein the outlet is biased into a first position by an actuator, and wherein the outlet is configured to move into a second position against a biasing force of the actuator in response to the residue portion traveling through the outlet.

20. The agricultural combine harvester of claim 19, wherein the actuator is a spring.

* * * * *